(No Model.)
F. B. MUELLER.
BICYCLE STAND.
No. 518,325. Patented Apr. 17, 1894.
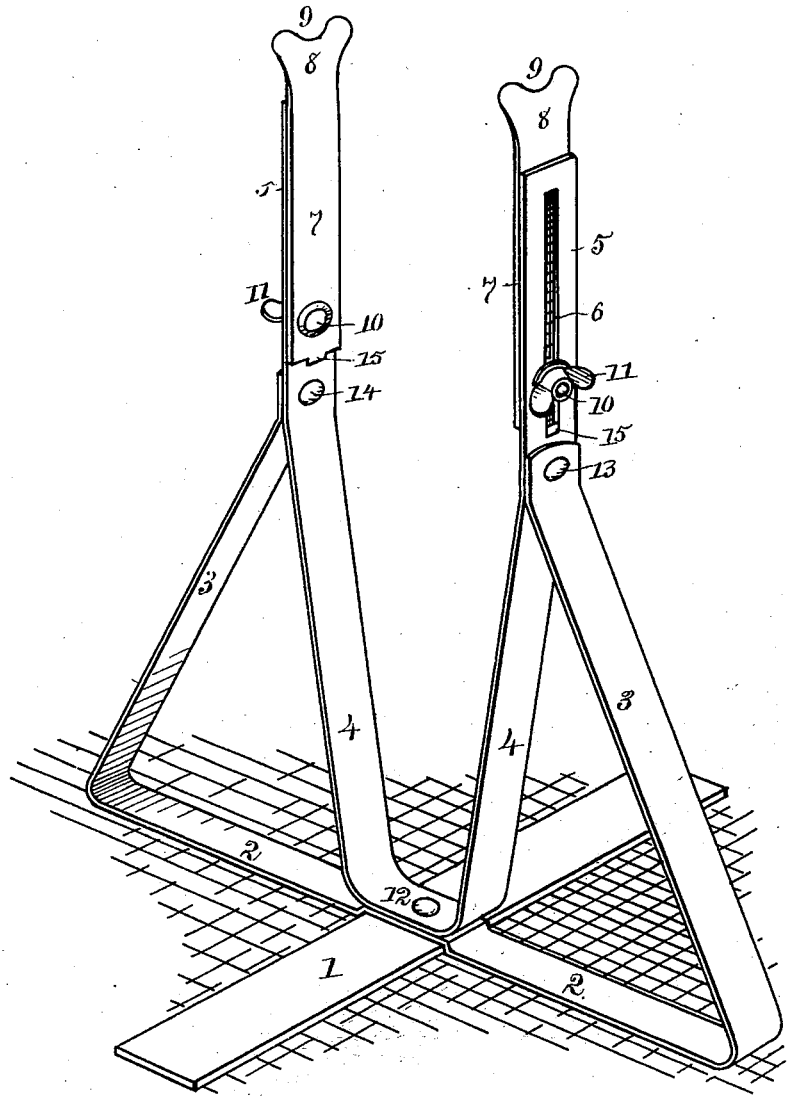
Attest
Helen Graham
William Graham
Inventor
Fred B. Mueller
by his attorney
L. P. Graham

UNITED STATES PATENT OFFICE.

FRED B. MUELLER, OF DECATUR, ILLINOIS.

BICYCLE-STAND.

SPECIFICATION forming part of Letters Patent No. 518,325, dated April 17, 1894.

Application filed April 18, 1893. Serial No. 470,864. (No model.)

*To all whom it may concern:*

Be it known that I, FRED B. MUELLER, of Decatur, in the county of Macon and State of Illinois, have invented certain new and useful Improvements in Bicycle-Stands, of which the following is a specification.

This invention is designed to support a bicycle in an upright position, and it consists in the details of construction and combinations of parts hereinafter set forth and claimed, whereby a stand containing the essential features of my invention may be simply and cheaply produced.

In the drawing forming a part of this specification a stand embodying my invention is shown in perspective. The base is formed of bars 1 and 2, intersecting each other centrally and at right angles, and bar 2 is bent to pass above bar 1 in such manner that the lower surfaces of both shall be in the same plane. The bar 2 is much longer than needed to form the base, and its ends 3, 3 are bent obliquely upward and inward to form braces for the supporting bars 4, 4. The supporting bars are formed of a continuous piece bent at its center and joined at such bend to the base bars at the point of intersection, they diverge slightly as they rise from the base, until they connect with braces 3, 3, and from such points they run parallel, as seen at 5, 5, and are provided with slots 6. Bars 7, 7 have studs 15 at their lower ends, which extend through slots 6, and they also have bolts 10 which extend through the slots and are provided with thumb nuts 11. The upper ends 8 of bars 7 are made sufficiently thin to readily pass between the wheel hub and the frame bearings, and their extreme upper surfaces are concaved, as seen at 9, to form rests for the axle. Rivet 12 connects bars 4 to the base and secures the base bars together, and rivets 13 and 14 secure braces 3 to bars 4.

In operation the bars 7 are raised to the proper height to sustain the bicycle and secured by the set nuts, and a wheel, preferably the rear one, is placed with its tire between bars 4, 4 and its axle resting in concavities 9 of bars 7. When so supported there is no injurious strain on the tire, there is but little to obstruct a view of the bicycle and what there is is symmetrically disposed and rather pleasing than otherwise, and the pedals may be worked to exhibit or clean the machine.

In some cases it may be found desirable to dispense with the adjustable feature of the stand, and in other cases the base and braces may be made differently for ornamentation or other purposes. Such modifications may be freely made without departing from the essential feature of my invention, so long as the lateral guides for the tire and the supports for the axle are preserved.

Having thus described my invention, I claim as new and desire to secure by Letters Patent—

1. A bicycle stand consisting of a central base bar 1, the base bar 2 secured to the central base bar at right angle thereto and having its ends bent obliquely upward, the bent bar 4 secured to the crossed base bars and having its upper ends longitudinally slotted, and the extension bars 8 substantially as described.

2. A bicycle stand consisting of a bar 4 bent at its center to form two divergent standing branches and extension bars 8 thereon, a bar 2 centrally secured to the bent bar 4, and having its ends bent obliquely upward and secured to said branches, and the bars 4 and 2 secured to the central bar 1 and at right angles thereto substantially as described.

3. In bicycle stands, the combination of base bar 1, base bar 2 intersecting bar 1 and having its ends extended obliquely upward, bars 4, 5, bent at their center, slotted at their upper ends and secured to the base bars and the extensions of bar 2, bars 7 having their upper ends thinned and concaved, and the studs, bolts and nuts securing bars 7 to the slotted ends of bars 4, 5, in a manner permitting longitudinal adjustment, substantially as set forth.

In testimony whereof I sign my name in the presence of two subscribing witnesses.

FRED B. MUELLER.

Witnesses:
 W. H. ELWOOD,
 H. E. KIZER.